FIG. 7

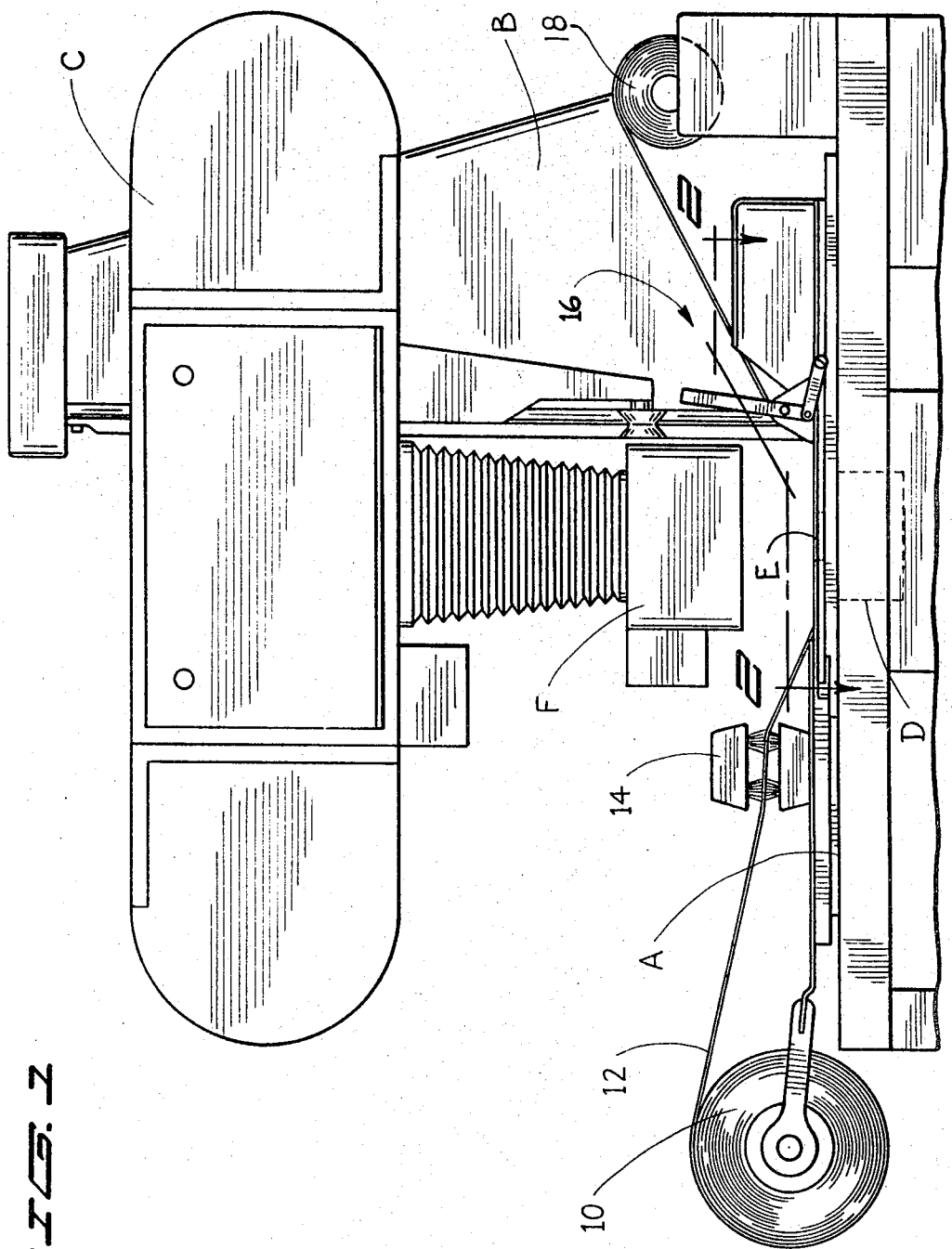

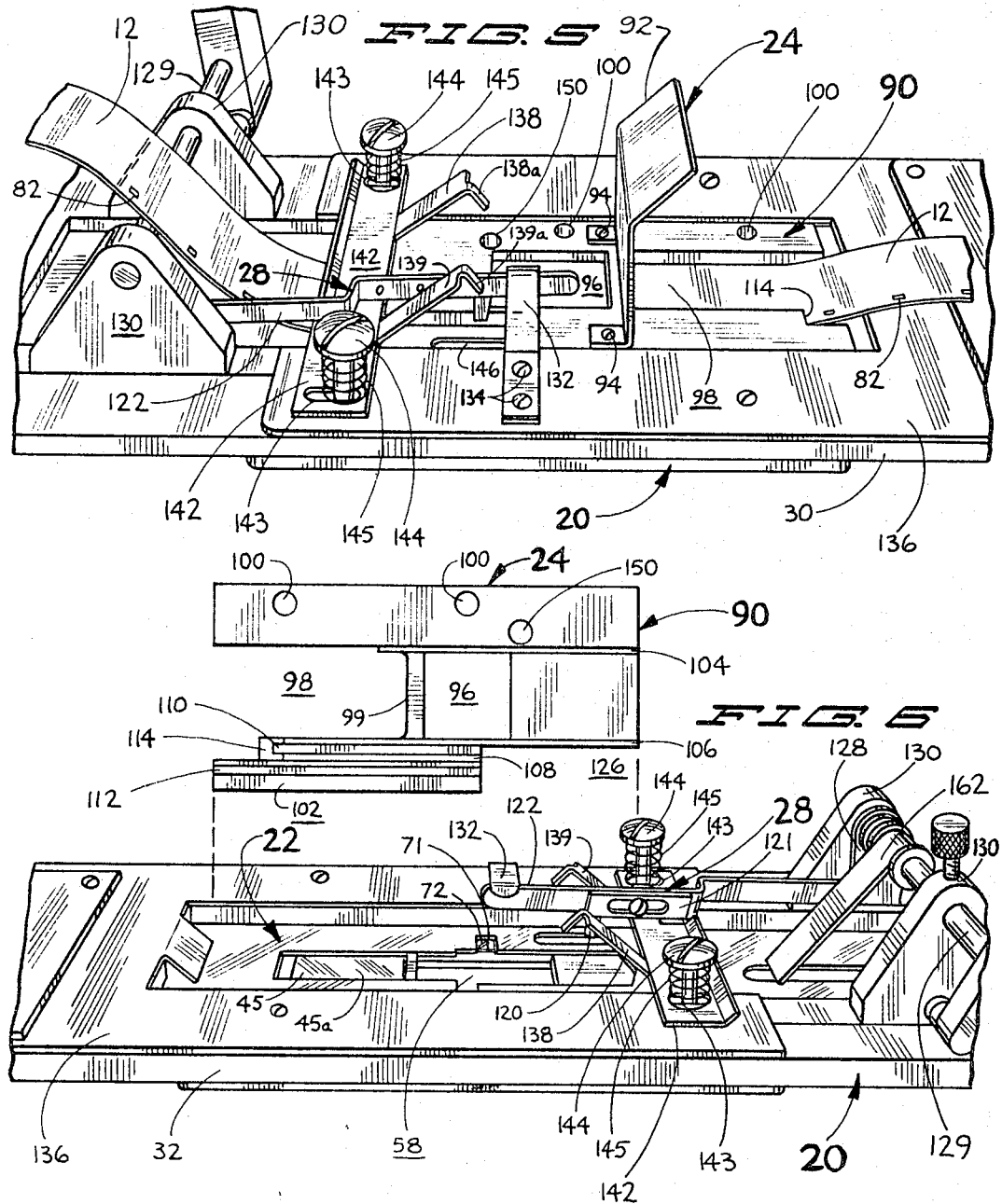

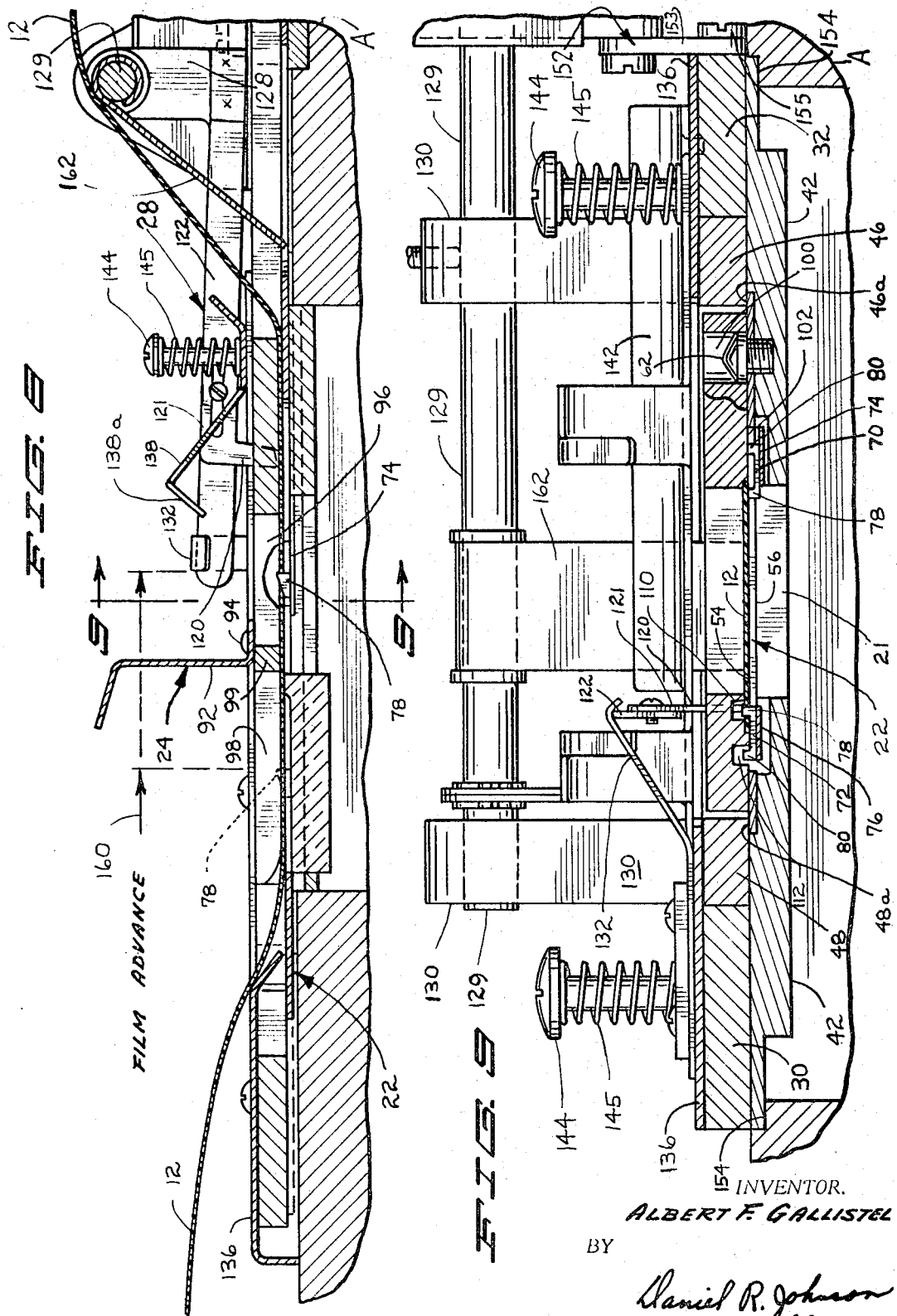

United States Patent Office 3,451,604
Patented June 24, 1969

3,451,604
AUTOMATIC FILM FEEDER
Albert F. Gallistel, Wayzata, Minn., assignor to Pako Corporation, Minneapolis, Minn., a corporation of Minnesota
Filed Oct. 4, 1966, Ser. No. 584,204
Int. Cl. G03b 1/28, 1/22
U.S. Cl. 226—56     7 Claims

ABSTRACT OF THE DISCLOSURE

A device for feeding negative film in roll form to a high production photographic printer. A lower film supporting mechanism cooperates with an upper mask assembly to provide a guideway for receiving and directing the film to the printing station of the printer. The film supporting mechanism reciprocates within a frame or slide bed and automatically advances the film on a frame-by-frame basis through the use of small spring loaded pawls adpated to mechanically engage the perforations along one edge of the film. The bottom surface of the masking assembly is designed to serve as a cam-like surface controlling the engagement and disengagement of the pawls.

---

This invention relates in general to a device for advancing film stepwise past the printing gate of a photographic printer. With the advent of high production photographic printers, there has developed an acute need for automatic feeding of the negative film to the printer. The present invention is designed to meet this need.

It is therefore the principal object of this invention to provide a device which receives the negative film in roll form and subsequently feeds it on a frame-by-frame basis to the printing station of the photographic printer.

Another object of the present invention is to provide a high speed negative advance which achieves precise registration of each negative frame with the mask opening of the printer.

Still another object of the invention resides in the provision of a novel feeding mechanism capable of receiving film of several sizes.

Another object of the invention is to provide an automatic film feeding device that employs a masking assembly which holds the negative flat and thereby eliminates the problem of optical interference resulting from air gaps between the negative and negative support.

Yet another object of the invention is to provide an automatic feeding device which is of simple rugged construction and which is simple and economical to fabricate.

A specific object of the invention resides in the mechanism for manually adjusting the longitudinal positioning of the film relative to the printing gate, as is necessary when the negative frames are not uniformly spaced.

Other objects will be apparent as the description proceeds.

FIG. 1 is an elevational view showing a photographic printer in conjunction with the automatic film feeder and illustrating the environment of the invention.

FIG. 2 is a plan elevational view taken on line 2—2 of FIG. 1.

FIG. 3 is a side elevational view of the film feeder.

FIG. 4 is a bottom elevational view of the film feeder.

FIG. 5 is a fragmentary perspective view showing the detail of the film feeder at the printing station.

FIG. 6 is a view similar to FIG. 5 but viewing the film feeder from the opposite side and illustrating the detail of the removable mask.

FIG. 7 is an enlarged assembly view showing in perspective the detail of the main component parts of the film feeder.

FIG. 8 is an enlarged sectional view taken on line 8—8 of FIG. 2.

FIG. 8 is an enlarged view taken on the line 9—9 of FIG. 8.

For the purpose of illustration of the invention, the automatic film feeder disclosed is shown as applied to a photographic printer such as disclosed in Patent No. 3,100,419 of Roy A. Clapp, filed Jan. 3, 1959 and assigned to the Pako Corporation. It is to be understood, however, that the invention is not limited to use in conjunction with photographic printers but may be used wherever a precision film feed mechanism is desired, such as in projectors, cameras, and other photographic equipment.

THE ENVIRONMENT OF THE INVENTION

A projection printer is shown in FIG. 1 having a table A which supports the various sections of the printer. Extending upwardly from the table is a column B which in turn supports a paper section C and an optical section F. These two sections are movable in an up and down direction to focus the image on the sensitized paper contained in paper section C. Mounted on the table A at its intermediate portion is an illuminating section D by means of which light may be passed through a negative situated at the printing station E at the upper surface of the table A. The term "printing station" contemplates the negative holder of the printer, i.e., the portion of the printer which holds and aligns the negative in proper printing position above the illuminating section of the printer.

Ordinarily, the printer operator manually places the individual negatives one at a time within the negative holder of the printer. With the present invention, the entire film strip is fed as a continuous web to and from the printing station. As seen in FIG. 1, several rolls of film may be spliced together and placed on a supply spindle 10. The film strip 12 is fed to a dust eliminator 14 before entering the automatic film feeder, generally designated by the numeral 16. The film feeder 16 feeds the film on a frame-by-frame basis to the printing station E of the printer. A take-up spool 18 receives the film as it leaves the film feeder 16.

A particular advantage of the invention resides in the simple manner in which it is adapted for use with the printer. The film feeder 16 is placed on the table A as a unit and is designed for quick and easy alignment with the negative holder, as described below. Accordingly, the present invention is well suited for use as an accessory component for converting the printer from manual operation to automatic operation.

Figure 7:
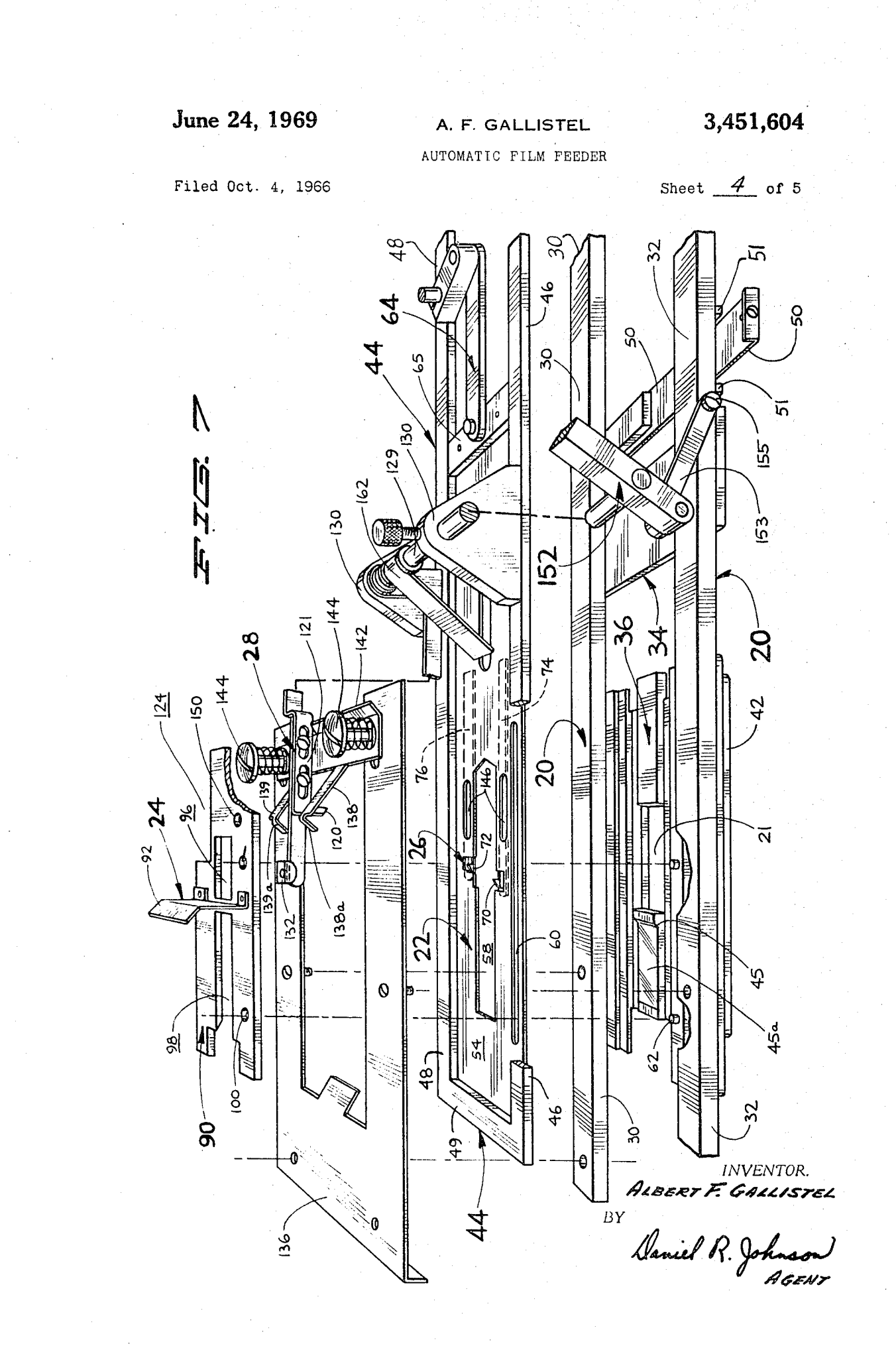

The main component parts of the film feeder 16 are best seen in FIG. 7. These components include a base assembly 20 which incorporates a supporting frame having an opening or printing gate 21 through which light may pass; a film support 22 which is adapted to be reciprocated from a rest position to a printing position whereby the film 12 is advanced stepwise to the printing gate 21, a mask assembly 24 which overlies the film support 22 and is co-operable therewith so as to define a guideway for directing the film to and from the printing gtae 21; detent means 26 which are carried by the support member 22 and which are adapted to frictionally engage the uniformly spaced perforations located along the edge of the film, thus providing a positive advance for moving the film in predetermined increments to the printing gate 21; and film restraining means 28 for preventing displacement of the film during the return stroke of the support member 22. Each of these main component parts will now be described in detail.

THE BASE ASSEMBLY

As best seen in FIG. 7, the base assembly 20 is comprised of a pair of longitudinal bars 30 and 32, a forward cross section 34 and a rear cross section 36. These parts are rigidly held together by well known means so as to form a solid rectangular frame for supporting the remaining components of the film feeder 16. The forward cross section 34 comprises a rectangular plate which has its opposite ends mounted to the bottom faces of the bars 30 and 32 and thus serves largely as a tie plate for reinforcement. Also, the cross section 34 presents an upper bearing face 35 extending between the bars 30 and 32 for slidably supporting the forward end portion of the film support 22, as will be described in detail below.

The construction of the rear cross section 36 is best understood by reference to FIG. 7 and the bottom view of FIG. 4 which show a pair of upper rectangular side sections 38 and 40 and a bottom square section 42. Side sections 38 and 40 lie in the same horizontal plane and are shown mounted to the underside of the longitudinal bars 30 and 32, respectively. Side sections 38 and 40 extend inwardly beyond the inner edges of the bars 30 and 32 so as to present the overlapping sections 38a and 40a. The bottom square section 42 is shown affixed by rivets 43 to the undersides of the side sections 38 and 40.

Bottom section 42 presents the printing gate or opening 21 for receiving the light from the printer illuminating section D. This opening 21 constitutes the forward portion of the rectangular cutout or opening which is shown formed in the bottom section 42. The rear portion of this opening is closed by a translucent plastic insert 45 which is mounted at 47 to the bottom face of section 42. The plastic insert 45 is preferably formed of methyl methacrylate, commonly known as "Plexiglas" and is dadoed within the opening to present an upper face 45a which lies in the plane of the film support 22 so as to assist in supporting the film as it is being fed through the film feeder. The plastic insert 45 also provides a means for previewing the negative before it arrives at the printing gate 21, as will be described in detail below.

An inner rectangular sub-frame assembly is generally designated 44 and includes a right leg 46, left leg 48 and a rear end leg 49. This sub-frame is dimensioned laterally so as to provide a slide fit with the inner edges of the bars 30 and 32. The rearward portions of the legs 46 and 48 of the sub-frame assembly 44 are shown slidably supported by the upper faces of the overlapping sections 38a and 40a, respectively. Similarly, the forward portions of the legs 46 and 48 are slidably supported by the upper bearing face 35 of the forward cross section 34.

The sub-frame assembly 44 thus constitutes an inner rectangular frame assembly which nestles within the outer frame assembly formed by the longitudinal bars 30 and 32 and the cross sections 34 and 36. This sub-frame assembly 44 is adapted for limited longitudinal displacement relative to the outer frame assembly. This relative displacement is limited through the provision of a forward transverse rail 50 which is secured at 53 to the bottom sides of the legs 46 and 48 of the subframe assembly 44. Rail 50 is shown extending beyond the right leg 46 of the sub-frame 44 so as to overlap the bar 32. Stops 51 are affixed to the bottom of bar 32 and are adapted to limit the displacement of the rail 50 and consequently limit the relative displacement of the sub-frame 44, the advantage of which will be subsequently described.

FILM SUPPORT

The film support 22 lies in a horizontal plane an is of rectangular configuration. As best seen in FIG. 7, the film support includes a top face 54, a bottom face 56, an elongated central opening 58 and a pin guide slot 60. The top face 54 serves as a supporting surface for the negative film which is being fed stepwise through the feeder. The central opening 58 is substantially rectangular and serves as an aperture for allowing the illuminating light to pass through to the negative. Pin guide slot 60 is shown receiving two aligning pins 62 which insure proper rectilinear motion of the film support 22 when it is reciprocated in the manner described below.

At 64 is shown a slider crank assembly which is coupled to the film support 22 at its forward end through a transverse coupling bar 65. This slider crank assembly 64 is driven by well known means (not shown) and is designed to impart reciprocating motion to the film support 22, i.e., the rotary motion of the crank imparts rectilinear back and forth motion of the coupling bar 65 which in turn causes the film support 22 to reciprocate in its horizontal plane.

The film support 22 is adapted for smooth and featherlike reciprocation because of the manner in which it is mounted within the inner sub-frame assembly 44. A slide bed is formed for the film support 22 through the provision of a pair of longitudinally extending shoulders 66 and 68 (see FIG. 9) which are respectively rabbeted along the inside edges of the frame assembly sections 38a and 40a. Note that the inner edges of the sub-frame legs 46 and 48 overlap the film support 22 along each edge through the provision of lip portions 46a and 48a. As will be readily appreciated, the lips co-operate with the shoulders 66 and 68 to provide a slide bed for the film support 22 along each edge. It will also be readily seen that the upper bearing face 35 of cross section 34 engages the bottom face 56 of the film support and thus additionally serves as part of the slide bed for the film support. Shoulders 66 and 68, upper bearing face 35, and the bearing surfaces presented by the lip portions 46a and 48a are all polished and well lubricated to facilitate the sliding action of the film support 22.

THE DETENT MEANS

The detent means 26 is carried by the film support 22 and includes a right pawl 70 and a left pawl 72. The pawls are shown spaced laterally from each other so as to straddle the central film support opening 58. The pawls are slightly offset longitudinally relative to each other. A pair of offset pawl receiving openings 71 and 73 are provided on the film support 22 to allow the pawls to extend upwardly so as to assume their normal positions slightly above the plane of the film support. At 74 and 76 are shown cantilevered leaf springs which respectively support the pawls 70 and 72, the pawls being mounted at the rearward ends of the leaf springs. The forward ends of the cantilevered leaf springs are riveted to the bottom face 56 of the film support 22 while the cantilevered or free end portions of the springs extend rearwardly in parallel spaced relation. Leaf spring 71 is made slightly longer than spring 73 to account for the longitudinal offset that is provided between the pawls.

The detail of each pawl is best seen by reference to FIGS. 8 and 9 which show each pawl having a film engaging claw 78 and a pawl releasing lug 80. The film engaging claws 78 are situated inwardly from the lugs 80 and are designed to engage the perforations 82 which are uniformly spaced along the film strip 12. The action of the leaf springs is to urge the pawls above the plane of the film support to thereby maintain the claws 78 into engagement with the particular perforation aligning itself above the claw.

The construction and function of the pawl releasing lugs 80 are best understood after considering the construction of the mask assembly 24, as will be now described in detail.

THE MASK ASSEMBLY

The mask assembly 24 serves four primary purposes: It cooperates with the film support 22 to provide a guideway for directing the film to and from the printing gate 21; it cooperates with the film support to hold the particular negative being printed in a flat position so as to insure against optical interference due to air gaps; it presents a mask for defining the border of the image being projected on the paper plane in the paper section C of the printer; and it presents a bottom surface which is operable on the detent means 26 to control the stepwise advance of the film to the printing gate 21.

It should be pointed out that the mask assembly 24 is removable as a unit from the remainder of the film feeder 16. It is this feature which allows an interchange of masks to permit the film feeder to accept film of various sizes, i.e., one mask is used for feeding the popular "126" size film while another mask is used for feeding film of another size, such as 35 mm. Although the drawings show the mask as would be used for feeding "126" size film, it should be understood that the construction of the various mask or mask assemblies is substantially the same, the differences being point out in the description below.

Referring particularly to FIGS. 5 and 6, the main components of the mask assembly 24 are the flat base member 90 and the handle 92, the latter being secured to the top side of the base member by screws 94. Base member 90 of the mask assembly is substantially rectangular and further includes a negative mask opening 96, a negative preview opening 98, mask alignment holes 100 and a bottom surface 102.

The mask alignment holes 100 are adapted to receive the top ends of the aligning pins 62. Accordingly, means is provided for insuring proper and quick positioning of the mask in its operative position. The operative position of the mask assembly is shown in FIG. 5 wherein the base plate 90 overlies the film support 22 and is nestled between the sub-frame legs 46 and 48. In this position, the negative mask opening 96 is in precise alignment above the printing gate 21, as is necessary in order to properly receive the illuminating light being projected upwardly by the printer illuminating section D. As stated above, the marginal edges of this negative mask opening defines the border of the image being projected to the paper plane.

The negative preview opening 98 is shown separated from the mask opening 96 by a small strut 99. Opening 98 is provided to permit the operator to view the negative immediately before it is advanced to the printing station, i.e., the operator gets an early look at the negative before it moves into registry with the negative mask opening 96. Accordingly, there is featured a "previewing station" defined by the opening 98 in cooperation with the plastic insert 45 which is in alignment therewith. The negative occurring at the "preview station" is supported by the upper face 45a of the plastic insert 45. Since the latter is translucent and is in close proximity to the illuminating section D of the printer, it transmits sufficient light to the negative supported on face 45a to enable the operator to make a judgment as to its "density." Thus, the operator can make any "density correction" for this negative during the dwell time of the first negative which is simultaneously being printed at the printing station.

FIG. 6 shows the mask assembly 24 removed from the remainder of the film feeder and turned on its side to illustrate the detail of the bottom surface 102. Bottom surface 102 is shown having three longitudinally extending film guide surfaces 104, 106 and 108. These three narrow surfaces lie in the same plane and are recessed slightly from the plane of the bottom surface 102. With the mask assembly 24 in its operative position, the surfaces 104, 106 and 108 engage the top surface of the film and thereby cooperate with the top face 54 of the film support to provide a guideway for directing the film strip 12 to the printing station. Note that the surface area of the mask which engages the film is kept to a minimum and situated so as to prevent scratching of the image area of the film strip. It should also be pointed out that the surfaces 104 and 108 are situated so as to align with the marginal edges of the film strip 12.

Situated between the film guide surfaces 106 and 108 is a claw receiving slot 110 which is designed to extend in parallel spaced relation above the line of travel of the left pawl 72. Slot 110 is suitably dimensioned so as to provide adequate clearance with the pawl 72 when the latter assumes its raised position, i.e., when the claw 78 is in engagement with the perforations of the film. Similarly, slot 112 is provided in spaced parallel relation above the line of travel of the lug 80 to receive the same when pawl 72 assumes its raised position.

The numeral 114 designates a beveled edge which facilitates threading the film strip 12 into the film feeder.

THE FILM RESTRAINING MEANS

Without the film restraining means 28 the inherent sliding friction between the film and the film support 22 may be sufficient to cause film slippage as the film support is reciprocated in the manner described above. To prevent this from happening, FIGS. 5, 6 and 8 show the film restraining means 28 having a film engaging leg 120 which is formed as part of an L-shaped member 121 which in turn is secured to a longitudinally extending lever arm 122. The leg 120 extends downwardly so its terminal end rests upon the top surface of the film strip 12. A corner cutout 126 is provided on the base member 90 of the mask assembly 24 to permit the leg 120 to rest on the film. Lever arm 122 is formed as an integral part of a depending arm 128 which is pivotally mounted to a cross shaft 129. Cross shaft 129 is in turn journaled between a pair of identical pillow blocks 130 that have their bases mounted to the top sides of the sub-frame legs 46 and 48.

The numeral 132 designates a lever arm retarder spring. This spring is shown mounted at 134 to the top surface of a main cover plate 136. This retarder arm spring 132 is shown having its upper end portion bearing upon the lever arm 122 to thereby urge the same in a downward direction. The action of the retarder spring 132 is to effect the desired pressure of the leg 120 on the film surface, i.e., pressure sufficient to prevent the film from moving or slipping during the return stroke of the film support.

On certain occasions it is desirable to release the film restraining means, such as when the operator finds it necessary to back up the film strip to repeat an exposure. This is achieved by depressing either of two identical film releasing arms 138 and 139. The releasing arms 138 and 139 are inclined upwardly at substantially a 45 degree angle and are formed as integral parts of a transverse lever plate 142. Each releasing arm includes a pawl releasing peg 138a and 139a, respectively. The opposite ends of the lever plate 142 are shown having slots 143 which receive tension screws 144. Helical springs 145 are shown encircling each stem of the tension screws 144 and bearing downwardly upon the top surface of the lever plate 142. These slots 143 are made slightly larger than the diameter of the stems of the tension screws 144. This permits limited pivotal movement of the lever plate 142 about an axis which lies substantially in the plane of the lever 142 and passes through the transverse centerline of the tension screws 144. This limited pivotal movement is effected by depressing the release arms 138 or 139. The limited pivotal movement of the lever plate 142 is sufficient to allow the operator to depress the release arms downwardly to the point where the pawl releasing pegs 138a and 139a engage the pawl leaf springs 74 and 76 to depress the same and thereby move the pawls to their depressed position. Note that the pawl release pegs gain access to the leaf springs through a pair of identical elongated slots 146 provided on each side of the central film support opening 58. Also, a small hole 150 in base member 90 of the mask assembly 24 permits the pawl release peg 138a to gain access to the leaf spring 74. Cutout 124 of the mask assembly permits pawl release peg 139a to gain access to leaf spring 76. When the lever plate 42 is pivoted by depressing the releasing arms the forward edge of the lever plate moves upwardly to engage the lower edge of the arm. The effect of this is to raise the lever arm 122 sufficiently to in turn cause the film engaging leg 120 to pivot above the surface of the film.

Thus, the depressing of the releasing arms serves a two fold purpose: it releases the detent means and it releases the film restraining means.

An auxiliary feature of the film feeder resides in a mechanism for adjusting the longitudinal position of the film relative to the printing station. This adjustment is required whenever the negative frames or image areas of the film become misaligned, i.e., they do not register with the negative mask opening 96 at the printing station. This misalignment results from the fact that occasionally the frames occur at uneven intervals. As long as the negative frames are spaced evenly the operator merely aligns the first frame with the printing gate and subsequent frames will fall in place as the film support is cycled in the manner described above. However, since the stroke or displacement of the film support is a constant amount, it follows that the uneven intervals between frames will cause misalignment. To correct this condition, a rocking fulcrum lever assembly 152 is employed to adjust the longitudinal positioning of the sub-frame assembly 44 relative to the outer base assembly 20. As stated above, the sub-frame assembly is adapted for limited longitudinal displacement relative to the base assembly 20. This relative displacement is achieved by actuating the lever assembly 152 which incorporates a linkage 153 which is pivotally connected at 155 to the base assembly bar 32. A rocking pivot point or gudgeon is supplied by the cross shaft 129 which has the lever assembly 152 mounted on its outer end.

By actuating the lever assembly 152 the entire sub-frame assembly 44 is caused to move in either longitudinal direction (depending upon the adjustment desired) relative to the base assembly 20 which remains fixed. Since the film support 22 is mounted within a slide bed supplied by the sub-frame assembly 44, it will also move with the assembly 44, the static friction between these two components being sufficient to cause them to move together as a unit. Also, the film being supported by the film support 22 will similarly move with the sub-frame assembly 44. Thus, actuation of the lever assembly 152 provides a means for adjusting the longitudinal positioning of the sub-frame assembly 44, the film support 22 and the film itself, all of which move together as a unit. Accordingly, when the operator encounters a misaligned negative frame, he merely adjusts the lever assembly 152 until he visually observes that the negative frame is in proper alignment.

FIG. 8 also shows a film deflection plate 162 which directs the film upwardly as it leaves the film feeder 16 and thereby assures proper feeding of the film to the take-up spindle 18.

THE OPERATION

Initially, the film feeder 16 is set into operation by aligning it on the printer table A. FIG. 9 shows the table A having the recessed shoulders 154 which receive the outer edges of the side sections 38 and 40. It is by this construction that the feeder 16 drops into place and thereby is properly aligned relative to the illuminating section of the printer. With the film feeder 16 in its operative position on the printer table A and assuming "126" size film being fed from the supply spindle 10, the operation is as follows: The operator places the mask assembly 24 in its operative position (as best seen in FIGS. 5 and 8) and the end of the film strip is threaded via the beveled edge 114 into the film guideway defined by the mask assembly 24 co-operating with the film support 22, as described above. To enable the film strip 12 to advance beyond the normally raised pawls, it is necessary for the operator to depress the pawl release arms 138 or 139. As stated above, this also releases the film restraining means 28. The film can then be threaded through the mask assembly until the first negative frame or image area arrives in proper printing position, i.e., it becomes aligned with the mask negative opening 96. As the first frame is being aligned, the operator will normally release the pawl release arms and thereby allow the film engaging claw 78 of pawl 72 to assume its raised position into engagement with one of the film perforations 82. Some jostling (back and forth) of the film strip may be necessary until the film engaging claw 78 of pawl 72 "snaps" into place. Also, the operator may need to employ the lever assembly 152 to adjust the longitudinal positioning of the film strip relative to the negative mask opening 96. When the first frame has been properly aligned relative to the mask opening 96, it is ready for printing.

After the printing of the first frame has been completed, the operator presses a feeder cycle button (not shown) which is conveniently located on the lever assembly 152. When this button is pushed, the film support 22 is advanced or cycled forwardly a distance corresponding to the arrows 160 of FIG. 8. In this position, the second negative frame is in position for printing. The film is held in this position through the provision of the film restraining means 28 as the film support 22 is returned to its rearward rest position. Note that the film engaging claws are beveled to insure their disengagement from the film as the film support moves rearwardly. Since the film remains fixed while the film support moves to the rear, the action of the beveled edge on the claw 78 is to cause the same to drop out of the film perforation and remain disengaged until the film support 22 returns to its initial rest position whereby the film engaging claw is again free to assume its raised position and engage the next film perforation. Subsequent cycling of the film feeder is merely a repeat of the steps above.

During the feeding of the "126" size film as described above, the right pawl 70 has been held in its depressed position because no clearance is provided above its line of travel, i.e., the mask assembly surface 102 abuts against the pawl releasing lug 80 of pawl 70 and the latter maintains a disengaged position below the surface of the film support. However, to adapt the film feeder 16 for handling "135" size film, a second mask assembly is used in place of the one described above. This second mask assembly is designed to allow pawl 70 to assume its normally raised position while pawl 72 is held depressed. Accordingly, the mask assembly for "135" size film functions in a reverse manner from that used for "126" size film. It will be apparent that this is achieved by substantially reversing the construction of the base member 90 of the mask assembly 24. Thus, instead of arranging the slots 108 and 110 so as to provide clearance for the left pawl, the "135" size mask assembly has similarly extending slots which are aligned above the path of travel of the right pawl 70. Similarly, the flat surface of the base member is presented above the left pawl 72 to maintain it in its depressed position. When feeding "135" film, the operational steps are substantially the same as that described above. However, in the case of film of this type, the film perforations are closely spaced so that eight perforations will normally constitute a frame length. Thus, instead of engaging every perforation as is the case when feeding "126" size film, the film engaging claw will pass over seven of the perforations on the return stroke before engaging the eighth perforation.

It should be pointed out that the film feeder may be readily adapted for feeding half-frame 35 mm. film. In this instance, the longitudinal length of the pawl receiving slots or recesses 110 and 112 on the mask base member 90 are made shorter, i.e., they do not extend the full length of the base member as shown in the drawings. By shortening the length of these recesses, the pawls are disengaged before the film support completes its stroke. Thus, it is possible to achieve shorter film advances than that provided by a full stroke. In the case of half-frame 35 mm. film, the length of the recess is such that the film advance is one-half that of regular 35 mm. film.

It is apparent that many variations and modifications may be made without departing from the true spirit of the invention and therefore the invention is to be limited only by the appended claims.

What I claim is:

1. A device for feeding film having perforations uniformly spaced longitudinally thereof comprising:
   (a) a base assembly incorporating a frame member having a printing gate therein,
   (b) a film support member reciprocably mounted within said frame member and being movable from a rest position to a printing position,
   (c) a mask assembly overlying said film support and co-operable therewith so as to define a guideway for directing the film to and from the printing gate,
   (d) detent means on said support member being adapted to mechanically engage the film perforations when said film suport member is in rest position and advance the film a predetermined distance to a printing position above said printing gate, said detent means including a pair of spring biased pawls, each of said pawls being movable from a raised position in engagement with the film perforations to a depressed position out of engagement with said perforations,
   (e) a bottom surface on said mask assembly being operative upon said pawls so as to permit engagement of one of said pawls into the film perforations while simultaneously depressing the other of said pawls to prevent its engagement with the film, and
   (f) film restraining means for preventing displacement of the film while the film support is returned to its rest position.

2. The structure as specified in claim 1 wherein said bottom surface of said mask includes a recess extending longitudinally in spaced parallel relation above the line of travel of one of said pawls.

3. The structure as specified in claim 2 wherein there is provided means for adjusting the longitudinal positioning of the film relative to the printing gate.

4. A device for feeding film having perforations uniformly spaced longitudinally thereof comprising:
   (a) a base assembly incorporating a frame member having a printing gate therein,
   (b) a film support member reciprocably mounted within said frame member and being movable from a rest position to a printing position,
   (c) a mask assembly overlying said film support and co-operable therewith so as to define a guideway for directing the film to and from the printing gate, said mask being engageable with the film to hold the same in printing position,
   (d) detent means on said support member being adapted to frictionally engage the film perforations when said film support member is in rest position and advance the film a predetermined distance to a printing position above said printing gate, said detent means being adapted to be disengaged from the film perforations when said film support is being returned from its printing position to its initial rest position,
   (e) film restraining means for preventing displacement of the film while the film support is being returned to its rest position, and
   (f) means for adjusting the longitudinal positioning of the film relative to said printing gate.

5. The structure as specified in claim 4 wherein said mask includes a bottom surface which is operative upon said pawls so as to permit engagement of one of said pawls into the film perforations while simultaneously depressing the other of said pawls to prevent its engagement with the film.

6. The structure as specified in claim 5 wherein said bottom surface of said mask includes a recess extending longitudinally in parallel spaced relation above the line of travel of one of said pawls.

7. The structure as specified in claim 6 wherein the said recess in the bottom of said mask is shorter than the full stroke of the reciprocating film support so that a lesser number of the longitudinally spaced perforations in the film may be advanced.

References Cited

UNITED STATES PATENTS

| | | | |
|---|---|---|---|
| 693,856 | 2/1902 | Granichstaedten | 226—67 |
| 1,311,238 | 7/1919 | Le Roy | 226—59 |
| 1,340,511 | 5/1920 | White. | |
| 1,403,106 | 1/1922 | Pittman | 226—67 |
| 1,425,450 | 8/1922 | Chanier. | |
| 1,444,884 | 10/1921 | Pittman | 226—67 X |
| 1,716,989 | 6/1929 | Troland. | |
| 1,885,229 | 11/1932 | Burkhardt. | |
| 2,260,530 | 10/1941 | Ludwig. | |
| 2,419,759 | 4/1947 | Briskin et al. | 226—59 |
| 3,152,741 | 10/1964 | Jorgensen | 226—65 |

ALLEN N. KNOWLES, Primary Examiner

U.S. Cl. X.R.

226—58, 67, 89, 108